United States Patent
Warden et al.

(10) Patent No.: US 10,207,592 B1
(45) Date of Patent: Feb. 19, 2019

(54) AUTONOMOUS HYBRID POWER GENERATION PLATFORM

(71) Applicant: GM Global Technology Operations LLC, Detroit, MI (US)

(72) Inventors: Steve A. Warden, Port Perry (CA); Jarvis Chau, Markham (CA); Ralph D. Schlottke, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/800,591

(22) Filed: Nov. 1, 2017

(51) Int. Cl.
*H02K 7/18* (2006.01)
*B60L 11/18* (2006.01)
*B60L 11/02* (2006.01)
*G05D 1/02* (2006.01)

(52) U.S. Cl.
CPC .......... *B60L 11/1827* (2013.01); *B60L 11/02* (2013.01); *B60L 11/1881* (2013.01); *G05D 1/021* (2013.01); *H02K 7/1823* (2013.01)

(58) Field of Classification Search
CPC .. B60L 11/1827; B60L 11/02; B60L 11/1881; G05D 1/021; H02K 7/1823
See application file for complete search history.

(56) References Cited

U.S. PATENT DOCUMENTS

| | | | |
|---|---|---|---|
| 9,592,742 B1 * | 3/2017 | Sosinov | B60L 11/1827 |
| 9,770,993 B2 * | 9/2017 | Zhao | B60L 11/1846 |
| 2010/0314878 A1 * | 12/2010 | DeWitt | F01K 25/005 |
| | | | 290/52 |
| 2011/0036089 A1 * | 2/2011 | Triller | F02B 37/10 |
| | | | 60/608 |
| 2013/0076902 A1 * | 3/2013 | Gao | B25J 9/042 |
| | | | 348/148 |
| 2013/0306389 A1 * | 11/2013 | Penev | B60L 8/003 |
| | | | 180/165 |
| 2014/0010671 A1 * | 1/2014 | Cryer | B60W 10/30 |
| | | | 417/53 |
| 2014/0060070 A1 * | 3/2014 | Owens | C25B 9/08 |
| | | | 60/776 |
| 2016/0052423 A1 * | 2/2016 | Zhou | B60L 15/06 |
| | | | 701/22 |
| 2016/0114814 A1 * | 4/2016 | Donnelly | B61C 3/00 |
| | | | 290/3 |
| 2016/0211786 A1 * | 7/2016 | Rozman | H02K 11/042 |

(Continued)

*Primary Examiner* — Viet Nguyen
*Assistant Examiner* — Joseph Ortega
(74) *Attorney, Agent, or Firm* — Quinn IP Law

(57) ABSTRACT

A power generation platform for delivering power to an external load includes an electrical system mounted to an autonomously-controlled chassis. The chassis has a powertrain that is responsive to control signals from a controller. The electrical system includes a fuel cell or other clean power supply for propelling the chassis, a direct current (DC) charging unit, a turbojet, a battery pack, and one or more electric machines. The DC charging unit and the battery pack are selectively connectable to the external load to deliver power to the external load, e.g., a propulsion battery pack of a vehicle or other system. The turbojet has a compressor, combustion chamber, and turbine, and injects low-emissions fuel into and combusts the fuel in the combustion chamber. The electric machine(s) are rotatably coupled to the compressor and/or the turbine to generate and transmit electricity to the battery pack.

17 Claims, 3 Drawing Sheets

(56) References Cited

U.S. PATENT DOCUMENTS

| | | | |
|---|---|---|---|
| 2018/0058242 A1* | 3/2018 | Malkamaki | F01D 13/003 |
| 2018/0058336 A1* | 3/2018 | Munevar | H02K 7/1823 |
| 2018/0187604 A1* | 7/2018 | Poumarede | B64D 35/08 |
| 2018/0252158 A1* | 9/2018 | Malkamaki | F02C 1/06 |

* cited by examiner

AUTONOMOUS HYBRID POWER GENERATION PLATFORM

INTRODUCTION

An electric powertrain may be used in a battery electric, extended-range electric, or hybrid electric vehicle, as well as in power plants, robots, and mobile platforms. Electric powertrains are driven some or all of the time using output torque from one or more electric machines. Electric powertrains are equipped with a high-voltage energy storage system, typically a multi-cell battery pack and associated power electronics. The energy storage system becomes depleted during use, and therefore requires periodic charging. Plug-in versions of such electric powertrains may be charged by connecting the energy storage system to an external power supply. Charging typically involves connecting of an electrical cable from the offboard power supply, e.g., a charging station or a wall outlet connected to a municipal electrical grid, to a charging port of the vehicle. Charging may be available using 110V/220V standard home charging plugs, with more rapid charging being available via a direct current (DC) fast-charging station.

Development of vehicles having electric powertrains may, at least over the near term, outpace construction of permanent charging infrastructure such as electric car parks or other away-from-home charging facilities. Existing car park-based charging stations often operate on a first-come/first-served basis, with vehicle operators tending to connect to a given charging station while the operator is occupied with work or other activities. As a result, the vehicle may occupy the charging station well after the vehicle's energy storage system is fully charged. Additionally, while a corporate car park provides a convenient charging option for certain operators, particularly those who frequent such car parks on a daily basis, other operators may lack reliable access to charging infrastructure when away from their home charging station.

SUMMARY

An autonomous hybrid power generation platform is disclosed herein that is intended to help solve some of the above-noted availability problems associated with existing charging infrastructure, as well as to provide a mobile auxiliary power supply for various electrical applications. The power generation platform is configured to electrically charge a propulsion battery pack of a vehicle or deliver power to another external system, with access to the power generation platform being remotely scheduled, e.g., using a cloud-based or web-based application. The power generation platform autonomously drives to a requested location at an operator-scheduled time. Upon arriving at the location, the power generation platform automatically connects to the external load, such as by plugging a J1772 charging connector or a DC fast-charge coupler into a charging port of a vehicle whose battery pack requires recharging. When the charging or other power operation is complete, the power generation platform automatically disconnects from the external load and drives away, with optional cloud-based billing for the completed power service occurring in various embodiments.

In an example configuration, the power generation platform includes an autonomously-controlled chassis having a powertrain, a controller, and an electrical system. The powertrain is responsive to control signals from the controller. The electrical system, which is securely mounted to the chassis, may include a clean power supply such as a fuel cell stack or another clean/low-emissions power supply configured to output electricity to the powertrain at levels sufficient for propelling the chassis. The electrical system further includes a DC charging unit that is selectively connectable to an external load, such as a battery pack of a vehicle, and configured to deliver power to the external load, with the DC charging unit connected to an onboard battery pack aboard the chassis. The onboard battery pack may provide an initial charging current at the onset of the power delivery process.

Additionally, the electrical system includes a turbojet having a compressor, a combustion chamber, and a turbine. The turbojet injects a suitable low-emissions fuel such as liquid hydrogen or anhydrous ammonia into the combustion chamber where the fuel is mixed with oxygen, compressed, and combusted. One or more electric machines are rotatably coupled to the compressor and/or turbine, respectively, via a corresponding shaft and gearbox. The electric machine(s) may generate and transmit electricity to the onboard battery pack as part of the power delivery process noted above.

The autonomous power generation platform optionally includes a power inverter module and a set of induction coils. The induction coils may be positioned adjacent to the turbojet and are electrically connected to the onboard battery pack via the power inverter module. In such an embodiment, the compressor and turbine may be equipped with magnetic fan blades, e.g., fan blades that are equipped with permanent magnets, such that rotation of the magnetic blades in proximity to the induction coils induces an electrical current in the induction coils. The induced electrical current is thereafter used to help charge the onboard battery pack and/or the external load as needed.

An optional heat exchanger may be placed in thermal communication with an exhaust port of the turbine, with the heat exchanger electrically connected to the DC charging unit and operable for harvesting heat energy exiting the turbine. In other words, the heat exchanger is configured to convert the otherwise wasted heat energy from the turbine into supplemental electricity for delivery to the external load and/or the onboard battery pack.

A method is also disclosed herein for powering an external load using an autonomous power generation platform. The method may include controlling a state of a powertrain of an autonomously-controlled chassis via a controller, the chassis having an electrical system mounted thereto. The electrical system includes a fuel cell stack, a DC charging unit connected to an onboard battery pack, and a turbojet having a compressor, a combustion chamber, and a turbine. The turbojet is configured to inject a low-emission fuel into and combust the low-emission fuel in the combustion chamber of the turbojet. The method includes using the fuel cell stack to output electricity to the powertrain at levels sufficient for propelling the chassis, and also generating electricity via at least one electric machine rotatably coupled to one or both of the compressor and the turbine. Additionally, the method includes transmitting the generated electricity to the external load via the onboard battery pack and the DC charging unit in response to receipt of a power request by the controller.

The at least one electric machine may include first and second electric machines connected to and rotatable with the compressor and the turbine, respectively. In such an embodiment, generating electricity via at least one electric machine includes generating electricity via both of the first and second electric machines.

The electrical system may also include a power inverter module and induction coils, with the induction coils positioned adjacent to the turbojet and electrically connected to the battery pack via the power inverter module. The compressor and the turbine include magnetic blades in this embodiment, with the method further including inducing an electrical current in the induction coils via rotation of the magnetic blades, and then transmitting the induced electrical current to the external load via the onboard battery pack and the DC charging unit.

The electrical system may include a heat exchanger in thermal communication with an exhaust port of the turbine, with the heat exchanger being electrically connected to the DC charging unit. The method in such a configuration may include converting heat energy from the exhaust port into electricity via the heat exchanger, and thereafter transmitting the electricity from the heat exchanger to the external load via the onboard battery pack and the DC charging unit.

The chassis may be equipped with a telematics unit, with the method further including receiving the power request from a remote base station using the telematics unit, with the power request being indicative of an amount of power required by the external load.

A plurality of vehicles may have, as the external load, a respective high-voltage propulsion battery pack, with the power request including a state of charge of each of the propulsion battery packs. In such an embodiment, the method may include scheduling a charging order of the plurality of vehicles via the controller or the base station based on the state of charge.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
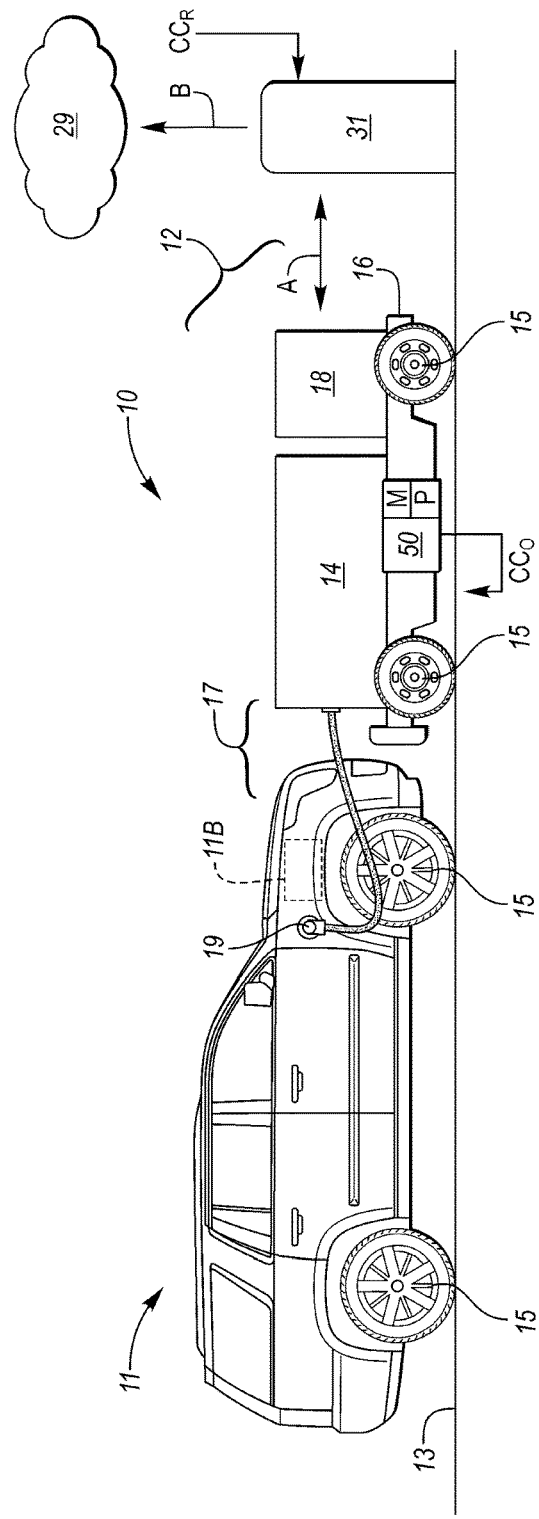
FIG. 1 is a schematic side view illustration of an autonomous power generation platform and an example external load in the form of a vehicle battery.

The present disclosure is susceptible to various modifications and alternative forms, and some representative embodiments have been shown by way of example in the drawings and will be described in detail herein. It should be understood, however, that the inventive aspects of this disclosure are not limited to the particular forms disclosed. Rather, the disclosure is to cover all modifications, equivalents, combinations, and alternatives falling within the spirit and scope of the disclosure as defined by the appended claims.

DETAILED DESCRIPTION

Referring to the drawings, wherein like reference numerals are used to identify like or identical components in the various views, FIG. 1 schematically illustrates a system 10 that includes a vehicle 11 and an autonomous power generation platform 12. The platform 12 is configured to electrically charge or power to an external load 11B. The vehicle 11 is depicted as an example motor vehicle 11 having wheels 15 in rolling frictional contact with a road surface 13. Such a vehicle 11 may be embodied as a plug-in battery electric vehicle, extended-range electric vehicle, or hybrid electric vehicle in different embodiments. In such embodiments, the external load 11B may be a relatively high-voltage direct current (DC) battery pack, e.g., 30 Volts DC (VDC), 60 VDC, 300 VDC, or higher depending on the embodiment.

While for illustrative consistency the vehicle 11 is described hereinafter as the system to be charged, other applications may exist for the power generation platform 12, such as but not limited to charging or direct powering of mobile platforms, subsystems, robots, or farm or industrial equipment. Likewise, the platform 12 may be operated as a mobile auxiliary power unit that, rather than charging, is used as a backup or reserve power supply. Regardless of the embodiment, it is expected that the vehicle 11 or other system includes an electrical port 19 that is accessible by the platform 12, such that a power cable 17 may extend from the charging platform 12 and couple to the electrical port 19 to commence power delivery to the external load 11B. The distal end of the power cable 17 may be equipped with a suitable electrical connector (not shown), e.g., a J1772 connector as is well understood in the art.

The power generation platform 12 includes an autonomously-controlled chassis 16 having wheels 15, a controller (C) 50, and a powertrain 52 (FIG. 2) responsive to control signals (arrow CCo) from the controller 50. As used herein, "autonomous" indicates that the chassis 16 has the ability to guide itself via the controller 50, i.e., self-driving or, in other words, without requiring a human driver. The controller 50 may be configured to control operation of the powertrain 52. Each of the controller 50 and a base station 31 as described below may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics.

The base station 31 may be optionally used to schedule a charging operation of the external load 11B, in this case a high-voltage propulsion battery pack for the vehicle 11, such as in response to a power request (arrow $CC_R$). The power request (arrow $CC_R$) may be may be website-generated or generated via a software application ("app"), e.g., via a cell phone, tablet computer, or other portable device. Such a power request (arrow $CC_R$) may uniquely identify the vehicle 11 and the external load 11B to be charged or otherwise electrically powered, a range of times or days that the vehicle 11 will be made available for charging/powering, the precise geolocation/coordinates of the vehicle 11, and any other information that may be required by the controller 50.

The power generation platform 12 includes an electrical system 14 mounted to the chassis 16 as shown. The electrical system 14 includes a power supply 18, e.g., a fuel cell stack or other clean energy supply, configured to output electricity to the powertrain 52 at levels sufficient for propelling the chassis 16. Additional or alternative sources of propulsion energy may be contemplated within the scope of the disclosure, such as internal combustion engines or electric powertrains. However, it may be desirable to limit the power supply 18 to low-emissions or zero-emissions variations, with possible options for the use of biofuels or other clean-burning fuel sources.

As part of the present approach, the autonomous power generation platform 12 may communicate remotely with the base station 31 as indicated by double-headed arrow A in FIG. 1. By way of example and not limitation, the platform 12 may be instructed, e.g., via telematics communication, as to the identity and location of the vehicle 11 whose external load 11B is to be charged. During and after charging, the platform 12 may transmit charging parameters to the base station 31 for recording. Example charging parameters may be the time of day and duration of the charging operation and the amount of electricity provided to the external load 11B. Using such information, the base station 31 may calculate a suitable charging cost, which in turn may be transmitted to one or more cloud-based servers 29 as indicated by arrow B, e.g., as part of a billing process for monetizing the described charging service.

Figure 2:
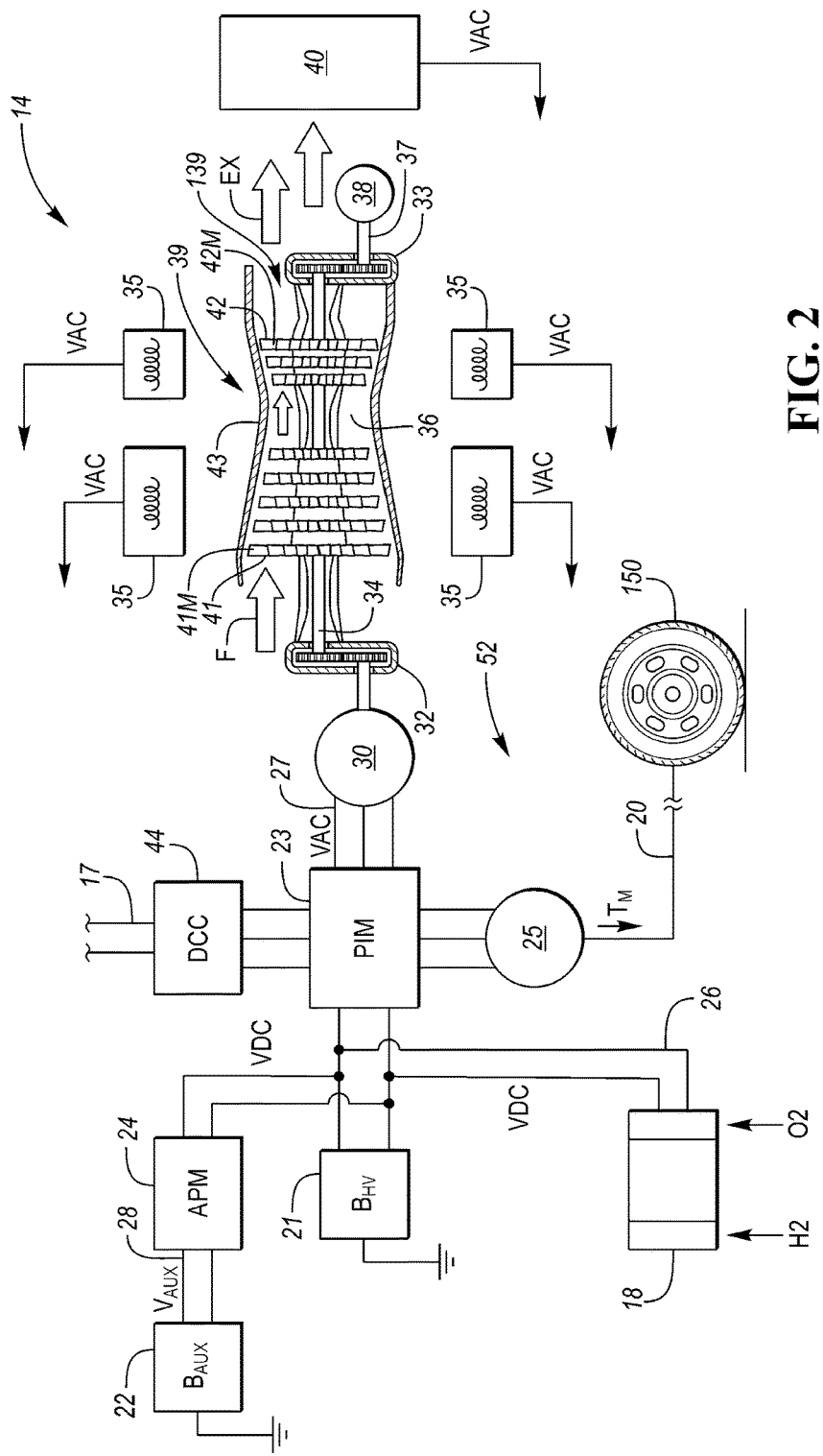
FIG. 2 is a schematic illustration of an embodiment of the autonomous power generation platform shown in FIG. 1.

Referring to FIG. 2, the electrical system 14 and the powertrain 52 are shown schematically to illustrate a possible charging configuration. With respect to the powertrain 52, the power supply 18 noted above with reference to FIG. 1 is shown as an example fuel cell stack in which hydrogen (arrow H2) combines with oxygen (arrow O2) to generate electric current on a DC voltage bus 26. Also connected to the DC voltage bus 26 are a high-voltage onboard battery pack ($B_{HV}$) 21 and a power inverter module (PIM) 23. An auxiliary voltage bus 28 and an auxiliary battery ($B_{AUX}$) 22 may be connected to the DC voltage bus 26 via an auxiliary power module (APM) 24 as shown, with the APM 24 embodied as a DC-DC converter suitable for reducing the voltage level on the DC voltage bus 26 to 12-15 VDC auxiliary voltage levels ($V_{AUX}$).

The PIM 23 is configured to invert the DC voltage (VDC) on the DC voltage bus 26 and thereby output an alternating current voltage (VAC) on an AC voltage bus 27, as well as rectify the AC voltage back to a DC voltage as needed. As is well known in the art, such inversion or rectification occurs in response to pulse width modulation or other switching signals controlling the on/off states of a set of semiconductor switches (not shown) of the PIM 23, as well as associated filtering and signal processing. The polyphase output of the PIM 23 may power phase windings of a traction motor 25 in some embodiments, with motor torque (arrow $T_M$) from the traction motor 25 delivered to a motor output shaft 20, and ultimately to one or more wheels 15 of the platform 12 of FIG. 1, e.g., through a planetary transmission or gear arrangement.

The electrical system 14 may include a DC charging unit (DCC) 44 that is connected or connectable to the high-voltage onboard battery pack 21 via the power cable 17 to recharge the external load 11B shown in FIG. 1. The DCC 44, as is known in the art, may be a voltage rectifier, possibly including a DC-DC voltage converter capable of outputting auxiliary and high-voltage DC charging power.

The electrical system 14 may also include a turbojet 39 having a housing 43, and first and second electric machines 30 and 38 each rotatably coupled to the turbojet 39. The turbojet 39 includes a compressor 41, a combustion chamber 36, and a turbine 42, with the turbojet 39 being configured to inject a low-emission fuel (arrow F) into a combustion chamber 36, compress the fuel after mixing with oxygen by operation of a compressor 41, and ultimately combust the fuel in the combustion chamber 36 to drive a turbine 42. Example fuels may include liquid hydrogen or anhydrous ammonia. The first electric machine 30 may be coupled to the compressor 41 via a respective gearbox and shaft 32 and 34 and configured as a starter motor. The second electric machine 38 may be coupled to the turbine 42 via a gearbox and shaft 33 and 37, respectively. The electric machine 38 is configured to generate and transmit electricity to the onboard battery pack 21 and, as needed, to the external load 11B (e.g., battery pack) of FIG. 1 during a charging operation.

A heat exchanger 40 may be placed in thermal communication with an exhaust port 139 of the turbine 42. In such an embodiment, the heat exchanger 40 may be electrically connected to the DC charging unit 44 and operable for harvesting waste heat energy exiting the turbine 42 into additional electricity for powering the DC charging unit 44. As is known in the art, waste heat-to-power is the process of generating electricity using heat energy. While omitted from FIG. 1 for illustrative simplicity, a typical configuration of the heat exchanger 40 when used for harvesting heat energy may capture thermal energy from the turbine 42 using thermoelectric materials, e.g., iron, antimony, titanium, or silicon nanowire-based materials, in which a temperature difference across the material is ultimately converted into a voltage, shown as arrow VAC in FIG. 2.

Additionally, a set of induction coils 35 may be positioned adjacent to the housing 43 of the turbojet 39 and electrically connected to the onboard battery pack 21, e.g., via the PIM 23. In such an embodiment, the compressor 41 and the turbine 42 may be equipped with magnetic blades 41M and 42M, respectively, such that rotation of the magnetic blades 41M and 42M induces an electrical current in the induction coils 35. Thus, the use of the magnetic blades 41M and 42M and the induction coils 35 forms a kinetic energy recovery system providing an additional source of charging current for supporting the overall charging operation. The magnetic blades 41M and 42M may be embodied as a set of permanent magnets affixed to radial ends of non-ferrous blades of the compressor 41 and the turbine 42, respectively. Alternatively, the entirety of the blades of the compressor 41 and the turbine 42 may be magnetized or formed from permanent magnets to a similar effect.

Figure 3:
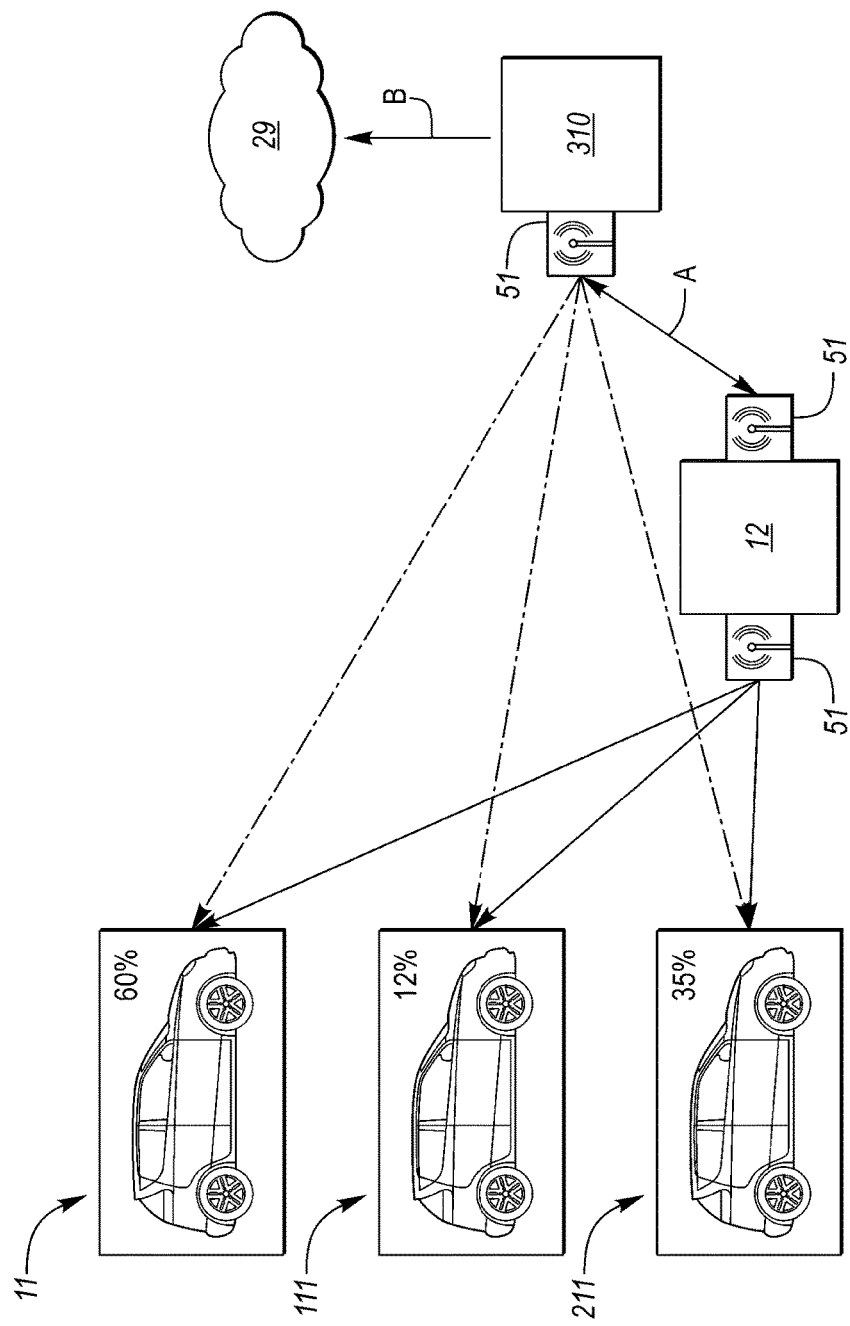
FIG. 3 is a schematic illustration of an optional control network for deploying the autonomous power generation platform of FIGS. 1 and 2 in a car park environment.

FIG. 3 illustrates a possible charging operation in which the autonomous power generation platform 12 of FIGS. 1 and 2 is used to charge a plurality of vehicles 11, 111, and 211 having a corresponding state of charge, shown here as 60%, 12%, and 35%, respectively. A base station 310 in communication with cloud servers 29 also communicates with the platform 12 via a telematics unit 51, for instance a radio transceiver. The base station 310 may receive the states of charge from each vehicle 11, 111, and 211 in the car park. In this concept, the platform 12 may patrol a car park to locate a vehicle 11, 111, or 211 having the lowest reported state of charge. The platform 12 may thereafter couple with the identified vehicle and charge or power the external load 11B thereof based on the state of charge and, possibly, the departure time as set by the operator prior to commencing the charging operation.

The base station 310 in this embodiment communicates with the autonomous power generation platform 12 wirelessly to determine the states of charge, or does so directly with the vehicles 11, 111, and 211. Thus, the power request (arrow $CC_R$) includes a state of charge of each of the external loads 11B, in this case individual propulsion battery packs, with the controller 50 programmed to schedule a charging order of the vehicles 11, 111, and 211 based on the states of charge. The base station 310 thereafter dispatches the platform 12. When charging is complete, the base station 310 may send billing information to the cloud server(s) 29 as noted above.

In view of the above-described autonomous power generation platform 12, one of ordinary skill in the art will appreciate that a method of powering an external load using the platform 12 is possible. Such a method may include controlling a state of the powertrain 52 via the controller 50, and using the power supply/fuel cell stack 18 of FIG. 2 to output electricity to the powertrain 52 at levels sufficient for propelling the chassis 16. Such a method would entail generating electricity via at least one electric machine rotatably coupled to one or both of the compressor 41 and the turbine 42 of FIG. 2, e.g., one or both of the electric machines 30 and 38, and thereafter transmitting the generated electricity to the external load 11B of FIG. 1 via the onboard battery pack 21 and the DC charging unit 44, doing so in response to receipt of the power request (arrow $CC_R$) by the controller 50. In other embodiments, the induction coils 35 and the magnetic blades 41M, 42M of FIG. 2 may be used as part of such a method to induce an electrical current in the induction coils 35 via rotation of the magnetic blades 41M, 42M, thereafter transmitting the induced electrical current to the external load 11B of FIG. 1 via the onboard battery pack 21 and the DC charging unit 44, and/or using the heat exchanger 40 of FIG. 2 to convert heat energy from the exhaust port 139 of the turbojet 39 into electricity to the same effect.

Using the approach set forth herein, autonomous charging or powering of the external load 11B may be realized with low or zero emissions. The concept may be employed within a well-defined boundary such as a car park, or it may be extended by allowing the platform 12 of FIG. 1 to travel public roadways in order to reach a specific location within an available operating range. As will be recognized by those of ordinary skill in the art, the platform 12 has multiple uses other than autonomous charging. For instance, the platform 12 may be used as an auxiliary power unit for the vehicle 11 or other external system, i.e., by furnishing electrical energy as needed. Options for personalization exist, as an operator has the capability of selecting the time and place of charging while the vehicle 11 is otherwise idle, and without requiring connection to the power grid. These and other benefits will be readily appreciated in view of the disclosure.

While the best modes for carrying out the disclosure have been described in detail, those familiar with the art to which this disclosure relates will recognize various alternative designs and embodiments exist within the scope of the appended claims. It is intended that all matter contained in the above description or shown in the accompanying drawings shall be interpreted as illustrative only and not as limiting.

The invention claimed is:

1. An autonomous power generation platform for powering or charging an external load, the platform comprising:
   an autonomously-controlled chassis having a controller and a powertrain responsive to control signals from the controller; and
   an electrical system mounted to the autonomously-controlled chassis and including:
      a power supply configured to output electricity to the powertrain at levels sufficient for propelling the chassis;
      a battery pack;
      a direct current (DC) charging unit that is connected to the battery pack and selectively connectable to the external load;
      a turbojet having a compressor, a combustion chamber, and a turbine, the turbojet being configured to inject a low-emission fuel into and combust the low-emission fuel in the combustion chamber of the turbojet; and
      at least one electric machine rotatably coupled to one or both of the compressor and the turbine, the at least one electric machine being configured to generate and transmit electricity to the battery pack.

2. The platform of claim 1, wherein the at least one electric machine includes first and second electric machines connected to and rotatable with the compressor and the turbine, respectively.

3. The platform of claim 1, further comprising: a power inverter module and a set of induction coils, the set of induction coils being positioned adjacent to the turbojet and electrically connected to the battery pack via the power inverter module, wherein the compressor and the turbine include magnetic blades such that rotation of the magnetic blades induces an electrical current in the induction coils.

4. The platform of claim 3, wherein the magnetic blades include permanent magnets affixed to radial ends of non-ferrous blades of the compressor and the turbine, respectively.

5. The platform of claim 1, wherein the power supply is a fuel cell stack.

6. The platform of claim 1, further comprising: a heat exchanger in thermal communication with an exhaust port of the turbine, wherein the heat exchanger is electrically connected to the DC charging unit, and is operable for converting heat energy from the exhaust port into electricity and transmitting the electricity to the battery pack.

7. The platform of claim 1, wherein the low-emission fuel is liquid hydrogen.

8. The platform of claim 1, wherein the low-emission fuel is anhydrous ammonia.

9. The platform of claim 1, wherein the chassis includes a telematics unit and the controller is programmed to receive a power request via a remote base station using the telematics unit, the power request being indicative of an amount of power required by the external load.

10. The platform of claim 9, wherein the external load includes multiple external loads each being a respective high-voltage battery pack, the power request including a state of charge of each of the high-voltage battery packs, and wherein the controller is programmed to schedule a charging order of the voltage battery packs based on the state of charge.

11. A method of powering an external load using an autonomous power generation platform, the method comprising:
   controlling a state of a powertrain of an autonomously-controlled chassis via a controller, the chassis having an electrical system mounted thereto, the electrical system including a fuel cell stack, a direct current (DC) charging unit connected to an onboard battery pack, and a turbojet having a compressor, a combustion chamber, and a turbine, the turbojet being configured to inject a low-emission fuel into, and combust the low-emission fuel in, the combustion chamber of the turbojet;
   using the fuel cell stack to output electricity to the powertrain at levels sufficient for propelling the chassis;
   generating electricity via at least one electric machine rotatably coupled to one or both of the compressor and the turbine; and transmitting the generated electricity to the external load via the onboard battery pack and the DC charging unit in response to receipt of a power request by the controller.

12. The method of claim 11, wherein the at least one electric machine includes first and second electric machines connected to and rotatable with the compressor and the turbine, respectively, and generating electricity via at least one electric machine includes generating electricity via both of the first and second electric machines.

13. The method of claim 11, the electrical system further including a power inverter module and a set of induction coils, the set of induction coils being positioned adjacent to the turbojet and electrically connected to the battery pack via the power inverter module, the compressor and the turbine including magnetic blades, the method further comprising: inducing an electrical current in the induction coils via rotation of the magnetic blades, and transmitting the induced electrical current to the external load via the onboard battery pack and the DC charging unit.

14. The method of claim 11, the electrical system further including a heat exchanger in thermal communication with an exhaust port of the turbine, the heat exchanger being electrically connected to the DC charging unit, the method further comprising: converting heat energy from the exhaust port into electricity via the heat exchanger, and transmitting the electricity from the heat exchanger to the external load via the battery pack and the DC charging unit.

15. The method of claim 11, wherein the low-emission fuel is liquid hydrogen or anhydrous ammonia.

16. The method of claim 11, wherein the chassis includes a telematics unit, the method further comprising: receiving the power request from a remote base station using the telematics unit, the power request being indicative of an amount of power required by the external load.

17. The method of claim 16, including a plurality of the external loads each being a respective high-voltage battery pack, the power request including a state of charge of each of the high-voltage battery packs, the method further comprising: scheduling a charging order of the high-voltage battery packs via the controller or the base station based on the state of charge.

* * * * *